United States Patent
Ohara

(10) Patent No.: US 9,542,143 B2
(45) Date of Patent: Jan. 10, 2017

(54) COMMUNICATION APPARATUS CAPABLE OF PERFORMING FACSIMILE COMMUNICATION, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Eiji Ohara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/662,754

(22) Filed: Mar. 19, 2015

(65) Prior Publication Data

US 2015/0277833 A1    Oct. 1, 2015

(30) Foreign Application Priority Data

Mar. 28, 2014   (JP) .................................. 2014-068642

(51) Int. Cl.
   *G06F 3/12*    (2006.01)
(52) U.S. Cl.
   CPC ........... *G06F 3/1286* (2013.01); *G06F 3/1236* (2013.01)
(58) Field of Classification Search
   None
   See application file for complete search history.

(56) References Cited

U.S. PATENT DOCUMENTS

| | | | | |
|---|---|---|---|---|
| 4,742,516 A | * | 5/1988 | Yamaguchi | H04H 60/27 340/7.48 |
| 5,140,612 A | * | 8/1992 | Yoshikawa | H04M 11/10 358/445 |
| 5,511,091 A | * | 4/1996 | Saito | H04L 7/0029 324/76.77 |
| 7,733,848 B2 | * | 6/2010 | Ulybin | H04L 12/4633 358/1.15 |
| 2007/0036276 A1 | * | 2/2007 | Tanimoto | H04M 1/24 379/1.01 |

FOREIGN PATENT DOCUMENTS

JP    2003134511 A  *  5/2003
JP    2006332889 A     12/2006

OTHER PUBLICATIONS

English Translation of JP 2003-134511, Miyano, Naoki, May 9, 2003.*

* cited by examiner

*Primary Examiner* — Miya J Cato
(74) *Attorney, Agent, or Firm* — Rossi, Kimms & McDowell LLP

(57) ABSTRACT

A communication apparatus capable of storing a facsimile signal with high quality. A modem processing unit performs facsimile communication. A modulated digital signal storing unit stores a digital signal that is modulated by the modem processing unit in order to transmit to an opposite-side apparatus in the facsimile communication into a storage unit without converting into an analog signal. A demodulated digital signal storing unit stores a digital signal that is obtained by demodulating a signal received from the opposite-side apparatus in the facsimile communication by the modem processing unit into the storage unit.

6 Claims, 11 Drawing Sheets

FIG. 11A
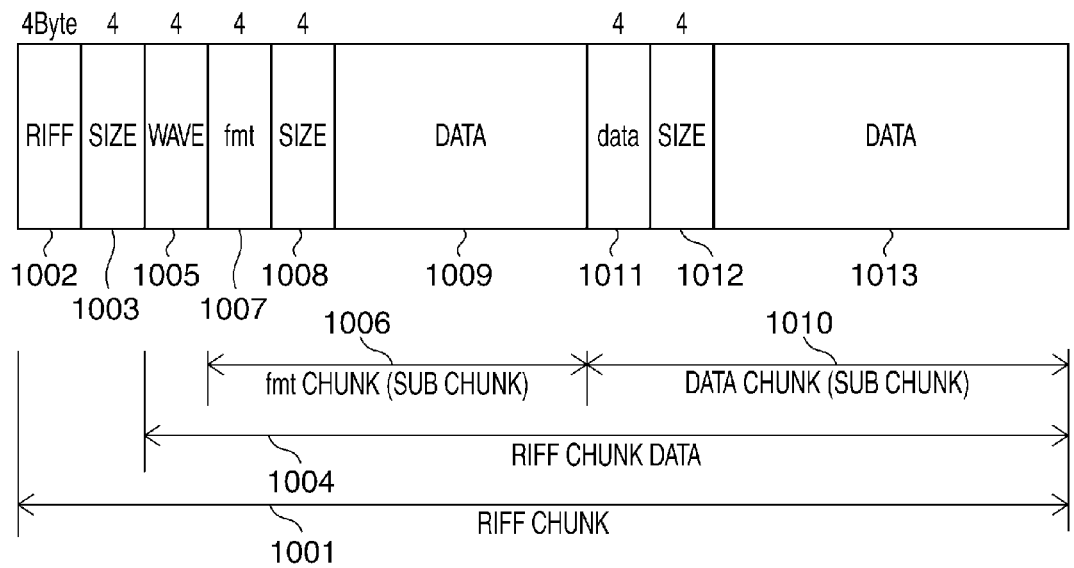
FIG. 11B
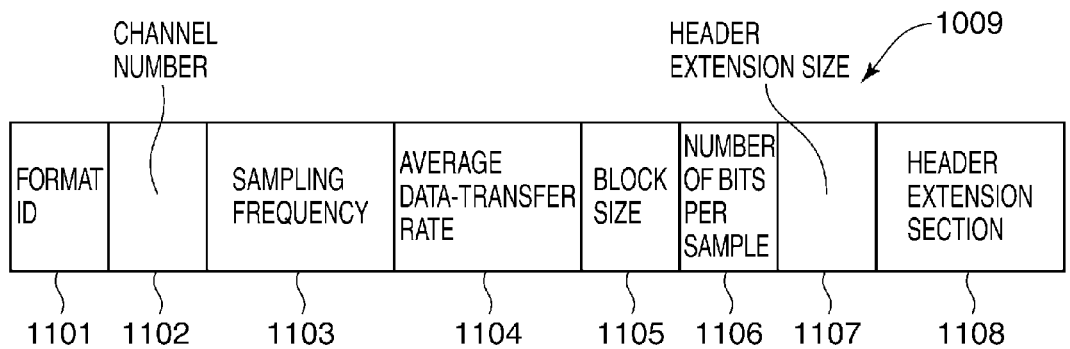
FIG. 11C
| FORMAT ID | FORMAT |
|---|---|
| 0x0001 | PCM |
| 0x0002 | MS ADPCM |
| 0x0006 | A-Law |
| 0x0007 | μ-Law |
| 0x0014 | ADPCM(G.723) |
| 0x0040 | ADPCM(G.721) |
| 0x0055 | MPEG Layer-3 |
| ⋮ | ⋮ |

COMMUNICATION APPARATUS CAPABLE OF PERFORMING FACSIMILE COMMUNICATION, CONTROL METHOD THEREFOR, AND STORAGE MEDIUM STORING CONTROL PROGRAM THEREFOR

BACKGROUND OF THE INVENTION

Field of the Invention

The present invention relates to a communication apparatus that is capable of performing facsimile communication, a control method therefor, and a storage medium storing a control program therefor.

Description of the Related Art

Conventionally, there is a technique of storing a facsimile signal in order to specify a cause of an obstacle, such as a communication error occurred during facsimile communication.

For example, there is a technique of storing a digital voice signal into which a voice file generation unit converts an analog voice signal, such as a facsimile signal D/A-converted by a facsimile modem, and transmitting the stored signal to a center apparatus through the Internet to analyze an obstacle in facsimile communication using a public network of a circuit switching system (see Japanese Laid-Open Patent Publication (Kokai) No. 2006-332889 (JP 2006-332889A)).

However, the conventional technique mentioned above A/D-converts an analog voice signal, which is D/A-converted by the facsimile modem, into a digital signal by the voice file generation unit. Thus, since there are two conversions between an analog signal and a digital signal, noise in the voice signal increases and accuracy of the voice signal drops.

On the other hand, a technique of providing a service through a LAN (Local Area Network) or an NGN (Next Generation Network) by replacing the conventional public network of the circuit switching system with a network based on an IP (Internet Protocol) technique will spread increasingly from now on.

An SIP (Session Initiation Protocol) that provides a service while a virtual session is established among a plurality of communication devices connected through the LAN or the NGN spreads, and is used.

Among the communication devices among which the session is established by the SIP, facsimile communication with a VoIP (Voice over IP) deemed voice is performed using a protocol, such as a VoIP.

However, since this case uses VoIP communication, there is no need for outputting an analog voice signal to a public line. This causes a problem that a facsimile signal that is a voice signal cannot be recorded and stored.

SUMMARY OF THE INVENTION

The present invention provides a communication apparatus, a control method therefor, and a storage medium storing a control program, which are capable of storing a facsimile signal with high quality.

Accordingly, a first aspect of the present invention provides a communication apparatus comprising a modem processing unit configured to perform facsimile communication, a modulated digital signal storing unit configured to store a digital signal that is modulated by the modem processing unit in order to transmit to an opposite-side apparatus in the facsimile communication into a storage unit without converting into an analog signal, and a demodulated digital signal storing unit configured to store a digital signal that is obtained by demodulating a signal received from the opposite-side apparatus in the facsimile communication by the modem processing unit into the storage unit.

Accordingly, a second aspect of the present invention provides a control method for a communication apparatus having a modem processing unit that performs facsimile communication, the control method comprising a modulated digital signal storing step of storing a digital signal that is modulated by the modem processing unit in order to transmit to an opposite-side apparatus in the facsimile communication into a storage unit without converting into an analog signal, and a demodulated digital signal storing step of storing a digital signal that is obtained by demodulating a signal received from the opposite-side apparatus in the facsimile communication by the modem processing unit into the storage unit.

Accordingly, a third aspect of the present invention provides a non-transitory computer-readable storage medium storing a control program causing a computer to execute the control method of the second aspect.

According to the present invention, the digital signal that the modem processing unit modulates for transmitting to the opposite-side apparatus in the facsimile communication is stored into the storage unit without converting into an analog signal. The digital signal that is obtained by demodulating a signal received from the opposite-side apparatus in the facsimile communication by the modem processing unit is stored into the storage unit. Accordingly, the facsimile signal is stored with high quality.

Further features of the present invention will become apparent from the following description of exemplary embodiments with reference to the attached drawings.

BRIEF DESCRIPTION OF THE DRAWINGS

FIG. 11A, FIG. 11B, and FIG. 11C are views for describing a WAV format that is a standard voice format.

DESCRIPTION OF THE EMBODIMENTS

Hereafter, embodiments according to the present invention will be described in detail with reference to the drawings.

Figure 1:
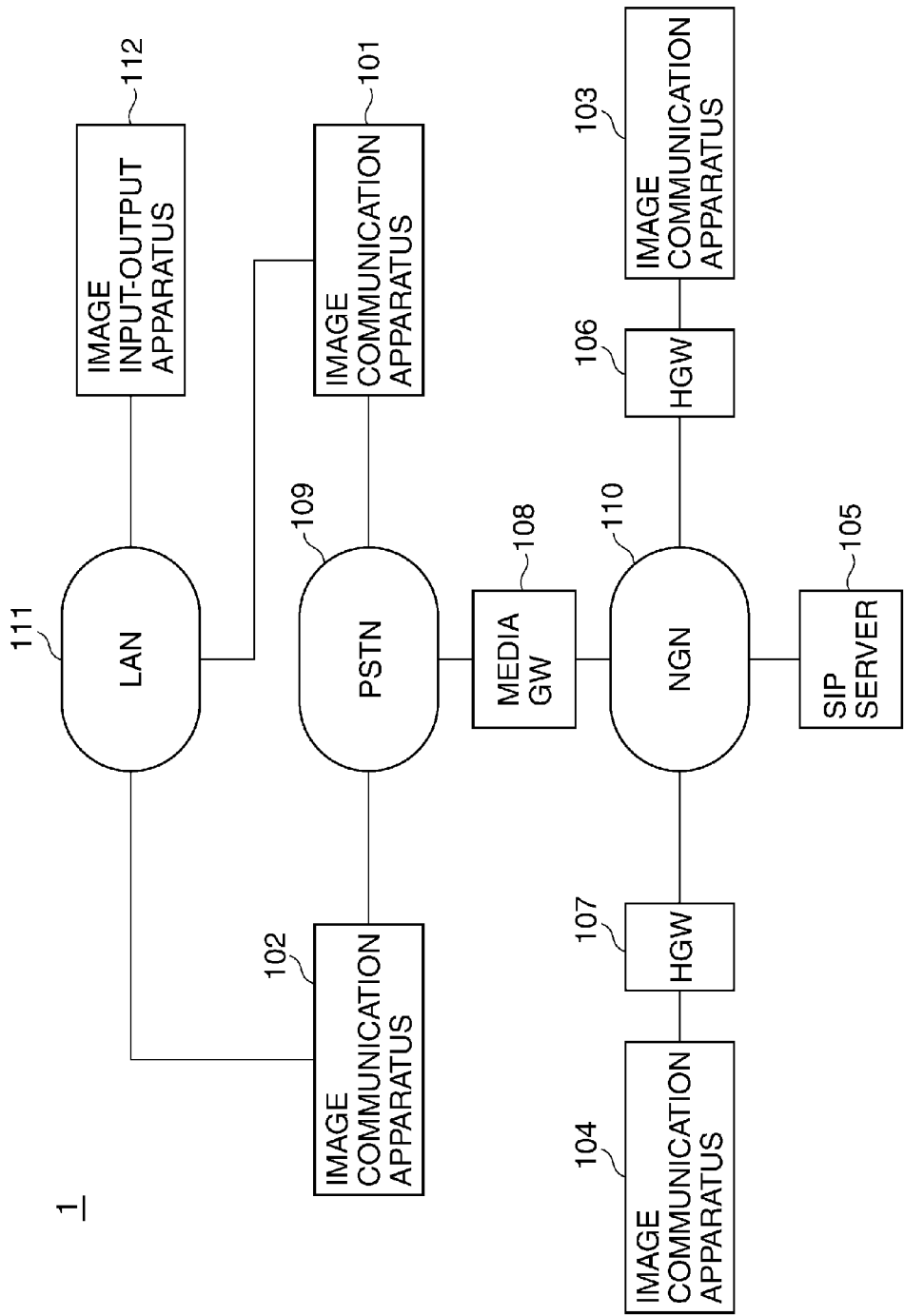
FIG. 1 is a block diagram schematically showing a configuration of a communication system including an image communication apparatus according to an embodiment of the present invention.

FIG. 1 is a block diagram schematically showing a configuration of a communication system 1 including an image communication apparatus as a communication apparatus according to an embodiment of the present invention.

As shown in FIG. 1, the communications systems 1 includes first-type image communication apparatuses 101 and 102, second-type image communication apparatuses 103 and 104, HGWs (Home Gateways) 106 and 107, a medium GW (Gateway) 108, and an SIP (Session Initiation Protocol) server 105.

The first-type image communication apparatuses 101 and 102 of them are G3 analog facsimile machines connected to a PSTN (Public Switched Telephone Network) 109, and perform facsimile communication according to analog facsimile procedures defined in the ITU-T recommendation T.30.

Moreover, the first-type image communication apparatuses 101 and 102 are connected to a LAN 111 that is an IP network. An image input-output apparatus 112 that has a server function and manages data etc. of the first-type image communication apparatuses 101 and 102 is further connected to the LAN 111.

The second-type image communication apparatuses 103 and 104 are connected to an NGN (Next Generation Network) 110 through the HGWs 106 and 107, respectively. The NGN 110 is connected with the PSTN 109 through the medium GW 108. Furthermore, the SIP server 105 is connected to the NGN 110.

The SIP server 105 among them provides an SIP service for performing conversion between a telephone number and an IP address etc. in order to perform a call connection process in an IP telephone service and IP facsimile communication.

The SIP server 105, the HGWs 106 and 107 are interface devices that perform facsimile communication by a digital facsimile procedure of the ITU-T recommendation T.38 and T.30 facsimile communication with a VoIP (Voice over IP) deemed voice by a digital facsimile procedure of the ITU-T recommendation T.30.

Moreover, the medium GW 108 is installed by a carrier and a network vendor. The medium GW 108 performs signal conversion between a voice signal and an IP packet, and controls a call to a subscriber's terminal, such as a voice terminal, connected to the PSTN 109 or the SIP server 105.

Accordingly, facsimile communication by the facsimile procedure of the ITU-T recommendation T.30 becomes possible between the image communication apparatuses 101 and 102 connected to the PSTN 109 and the image communication apparatuses 103 and 104 connected to the NGN 110.

Figure 2:
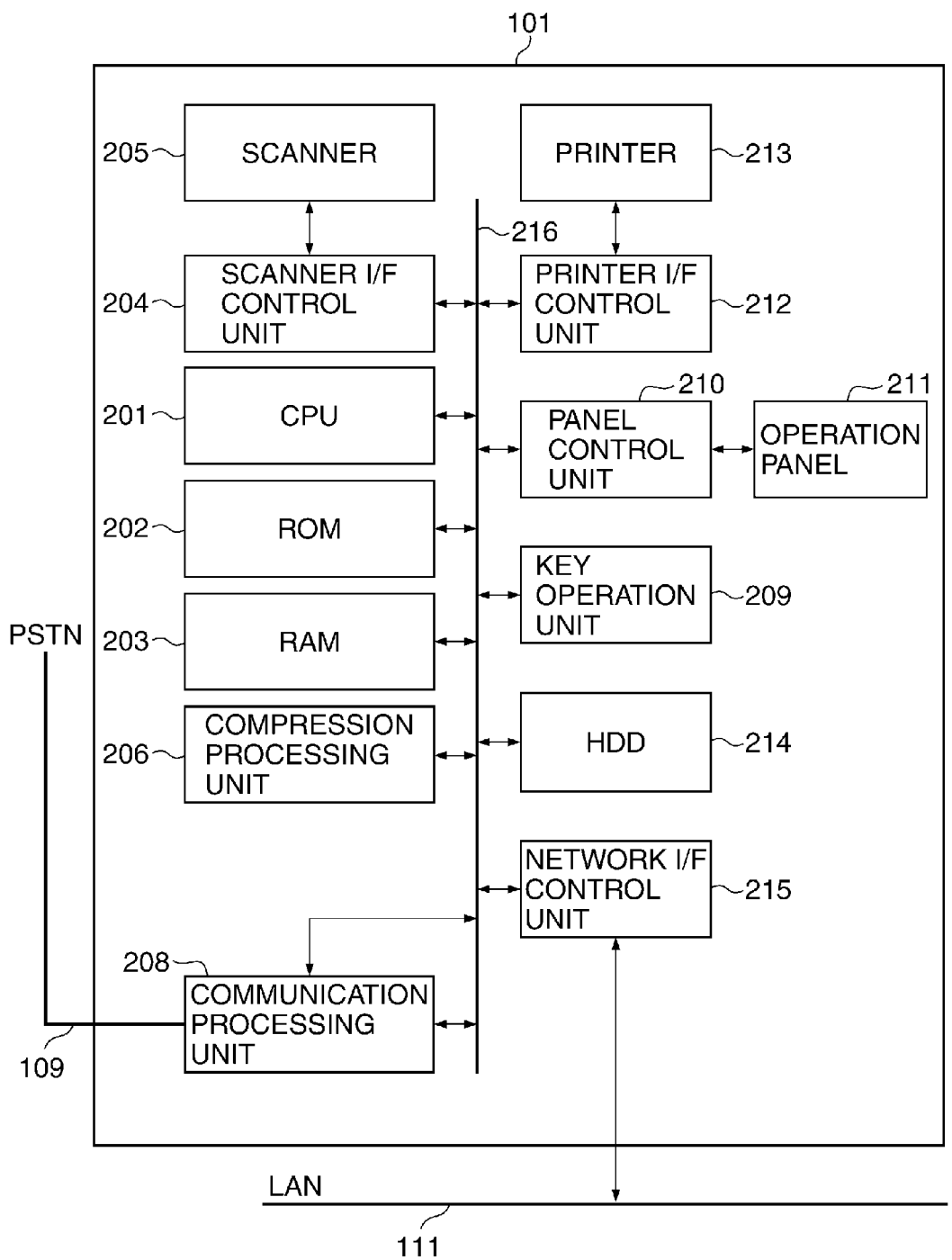
FIG. 2 is a block diagram schematically showing a configuration of a first-type image communication apparatus shown in FIG. 1.

FIG. 2 is a block diagram schematically showing a configuration of the first-type image communication apparatus 101 shown in FIG. 1. The first-type image communication apparatus 102 also has the same configuration as the first-type image communication apparatus 101.

As shown in FIG. 2, the first-type image communication apparatus 101 includes a CPU 201, a ROM 202, a RAM 203, a scanner interface (I/F) control unit 204, a scanner 205, a compression processing unit 206, a communication processing unit 208, a key operation unit 209, a panel control unit 210, an operation panel 211, a printer interface control unit 212, a printer 213, an HDD 214, and a network interface control unit 215.

The CPU 201 controls the entire image communication apparatus 101 according to a program stored in the ROM 202. Furthermore, the CPU 201 performs a protocol process of the TCP/IP, and assembles image data to a TCP/IP frame.

The ROM 202 stores various programs and various kinds of data. The RAM 203 is used as a work memory at the time of executing a program, and is also used for buffering image data transmitted and received.

The scanner 205 reads an original optically, and outputs a signal that indicates an original image to the scanner interface control unit 204. The scanner interface control unit 204 controls the scanner 205, and converts a signal output from the scanner 205 into digital image data. The image data is stored in the RAM 203 under control of the CPU 201, and is transmitted or printed.

The compression processing unit 206 performs encoding and decoding in MH, MR, MMR, or JBIG system. Moreover, the compression processing unit 206 compresses data by encoding image data at the time of transmitting the image data, and decodes encoded image data when receiving the image data.

The communication processing unit 208 performs a modulation-and-demodulation process required to perform facsimile communication through the PSTN 109, or performs a PCM (Pulse-Code Modulation) codec process in order to convert a facsimile communication signal into a PCM signal and to store it to the RAM 203.

The key operation unit 209 consists of a dial, manual operation buttons for facsimile transmission and reception, etc., and receives operations by a user. The operation panel 211 displays a variety of information to a user, and receives instructions input by a user. The panel control unit 210 controls the operation panel 211.

The printer 213 prints an image onto a recording sheet, such as paper. The printer interface control unit 212 controls the printer 213, converts image data obtained by facsimile reception or another method into raster print data, and outputs it to the printer 213.

The HDD 214 is a storage unit that stores various programs and various kinds of data. For example, the HDD 214 stores image data for printing, a PCM signal, etc.

The network interface control unit 215 is a LAN controller connected to the LAN 111, and transmits and receives data with using the procedure of the CSMA/CD (Carrier Sense Multiple Access/Collision Detection) system.

For example, the network interface control unit 215 adds a MAC (Media Access Control) frame header, an FCS (Frame Check Sequence), etc. to transmission data, and transmits the data according to the CSMA/CD system.

The system bus 216 connects the CPU 201, the ROM 202, the RAM 203, the scanner interface control unit 204, the compression processing unit 206, the communication processing unit 208, the key operation unit 209, the panel control unit 210, the printer interface control unit 212, the HDD 214, and the network interface control unit 215 with one another.

Figure 3:
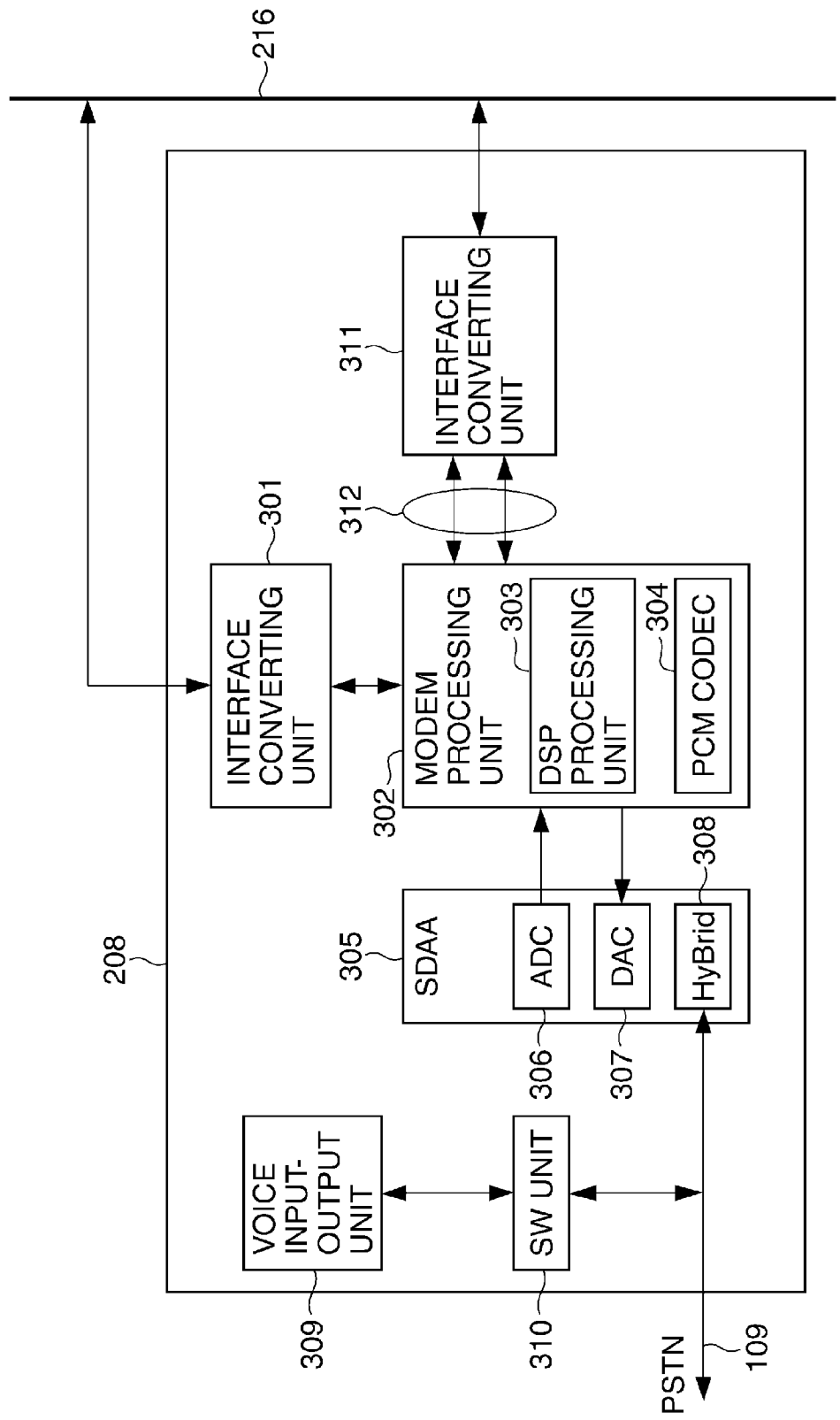
FIG. 3 is a block diagram schematically showing a configuration of a communication processing unit in FIG. 2.

FIG. 3 is a block diagram schematically showing a configuration of the communication processing unit 208 in FIG. 2.

As shown in FIG. 3, the communication processing unit 208 includes interface converting units 301 and 311, a modem processing unit 302, an SDAA (Silicon Data Access Arrangement) 305, a voice input-output unit 309, and an SW unit 310.

The interface converting unit 301 is connected between the system bus 216 and the modem processing unit 302, and performs conversion for fitting the interface for transmission and reception of data. The other interface converting unit 311 is connected between the system bus 216 and the PCM interface 312, and performs conversion for fitting to the PCM interface 312 for transmission and reception of data.

The PCM interface 312 is a general-purpose interface for performing a synchronous serial bidirectional transfer.

The modem processing unit 302 includes a DSP processing unit 303 and a PCM codec 304, and transmits and receives image data to and from the compression processing units 206 through the interface converting unit 301.

At the time of transmission of image data, compressed image data encoded by the compression processing unit 206 is input into the DSP processing unit 303. The DSP processing unit 303 digitally modulates compressed image data, and outputs it as a digital modulation signal of a voice grade to the SDAA 305 and the PCM codec 304.

At the time of receipt of image data, the DSP processing unit 303 digitally demodulates the received digital modulation signal of the voice grade, and outputs the encoded compressed image data to the compression processing unit 206 and the PCM codec 304.

The PCM codec 304 encodes the digital modulation signal, and outputs it as a PCM signal to the interface converting unit 311 through the PCM interface 312. The PCM signal output to the interface converting unit 311 is stored in the RAM 203.

The SDAA 305 is a semiconductor NCU (network control unit) that functions as an interface between the image communication apparatus 101 and the PSTN 109, and includes an ADC (A/D converter) 306, a DAC (D/A converter) 307, and a HyBrid 308.

Moreover, the SDAA 305 controls a capture state of the line when communicating with an opposite-side apparatus through the PSTN 109.

When the capture state of the line is controlled, direct-current impedance is adjusted so as to fit to DC-VI characteristics that is line current characteristics to predetermined direct-current line voltage.

At the time of transmission of data, the SDAA 305 converts a digital modulation signal that is digitally modulated in the DSP processing unit 303 into a modulated analog signal by the DAC 307, and sends it out to the PSTN 109 through the HyBrid 308.

Moreover, at the time of reception of data, the SDAA 305 makes the modulated analog signal received from the PSTN 109 input into the ADC 306 through the HyBrid 308, makes the ADC 306 convert it into a digital modulation signal, and then makes the converted signal input into the DSP processing unit 303.

Transmission and reception by the full duplex with two lines are performed in the PSTN 109. Transmission with two lines and reception with two lines, i.e., transmission and reception with four lines in total, are performed by the ADC 306, the DAC 307, and the DSP processing unit 303

Accordingly, the HyBrid 308 transmits a signal to the PSTN 109, and performs a two-line-four-line conversion that separates a reception signal by canceling a transmission signal in transmission and reception signals of the PSTN 109.

The voice input-output unit 309 is connected to the SW unit 310, and consists of a telephone or a hand set that inputs and outputs voice.

The SW unit 310 is a relay circuit connected between the voice input-output unit 309 and the PSTN 109, and switches between a connected state where the voice input-output unit 309 is connected to the PSTN 109 and a disconnected state.

For example, when the voice input-output unit 309 performs a voice call with an opposite-side apparatus through the PSTN 109, the CPU 201 controls the SW unit 310 to switch and controls the SDAA 305 to turn off the capture state of the line in order to keep the connected state where the voice input-output unit 309 is connected to the PSTN 109.

FIG. 4A through FIG. 4D are timing charts in the PCM interface 312 in FIG. 3.

Figure 4A:
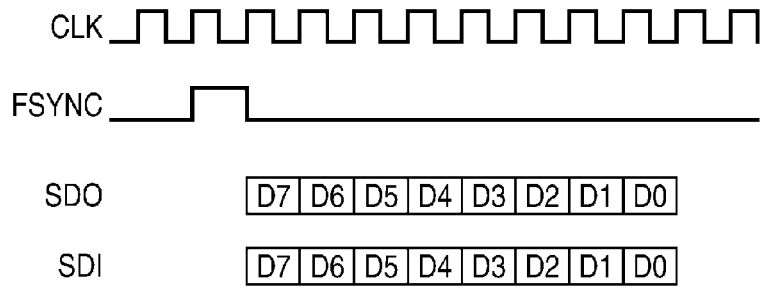
FIG. 4A through FIG. 4D are timing charts in a PCM interface in FIG. 3.
Figure 4B:
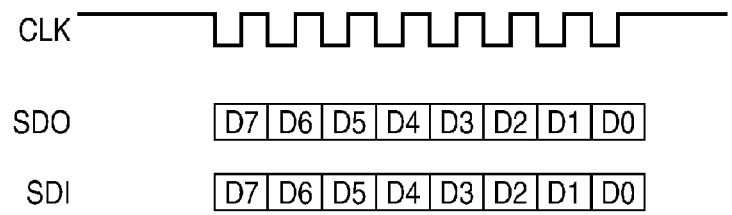
Figure 4C:
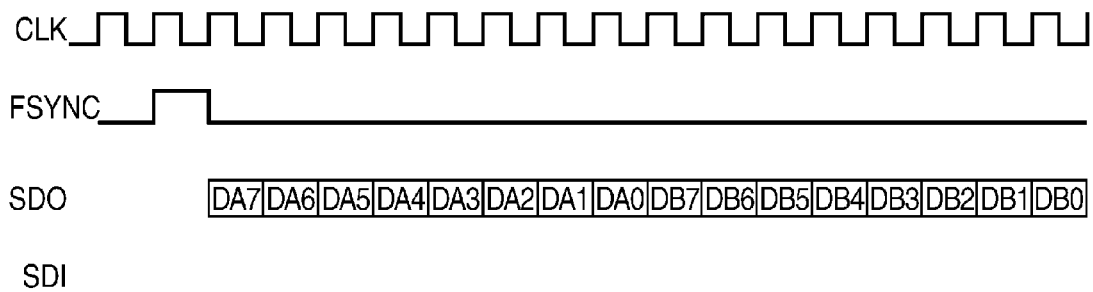
Figure 4D:
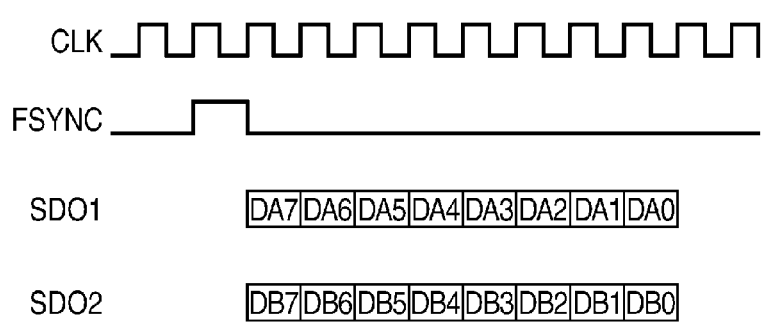

In FIG. 4A, through FIG. 4D, CLK, FSYNC, SDO, and SDI respectively represents a clock signal, a synchronizing signal, output data, and input data.

FIG. 4A is a timing chart in an example where four signal lines of CLK, FSYNC, SDO, and SDI are used.

In communication between PCM interfaces, one PCM interface serves as a master, the other serves as a slave, and the master determines transfer timing of the PCM interfaces. CLK and FSYNC are timing signals that the master supplies to the slave.

As shown in FIG. 4A, data signals start at a second rising edge of CLK from a rising edge of FSYNC. Eight continuous data signals from D7 to D0 of SDO and eight continuous data signals from D7 to D0 of SDI are effective data signals.

Moreover, since FSYNC is repeated at constant intervals, eight data signals of SDO and eight data signals of SDI are repeatedly transferred at every interval of FSYNC.

For example, when the DSP processing unit 303 processes a 16-bit digital signal, when the PCM codec 304 encodes a 16-bit signal to 8-bit signal, and when the synchronizing signal FSYNC is assumed as 8 kHz, the PCM signals are output at a transfer rate of 64 kbps.

ITU-T recommendation G.711 A-Law, μ-Law, etc. are used for the encoding to 8 bits from 16 bits by the PCM codec 304, for example. Thus, the format of the digital signal stored in the embodiment is one of the linear PCM, the G.711 A-Law, and the G.711 μ-Law.

Moreover, the modem processing unit 302 may output a linear PCM signal as 16-bit data processed by the DSP processing unit 303 without coding by the PCM codec 304. In this case, sixteen data signals of SDO are continuously output in synchronization with CLK.

FIG. 4B is a timing chart in an example where three signal lines of CLK, SDO, and SDI are used.

As well as FIG. 4A, one of the PCM interfaces serves as a master, the other serves as a slave, and the master determines the transfer timing of the PCM interfaces. CLK is a timing signal that the master supplies to the slave.

As shown in FIG. 4B, data signals start at a first falling edge of CLK that changes. Eight continuous data signals from D7 to D0 of SDO and eight continuous data signals from D7 to D0 of SDI in a period during which CLK continues are effective data signals.

Moreover, since the period during which CLK continues is repeated at constant intervals, eight data signals of SDO and eight data signals of SDI are repeatedly transferred at the constant intervals.

FIG. 4C is a timing chart in a case where data transfers of two channels are performed through SDO.

The two channels include a channel for transferring a received digital modulation signal and a channel for transferring a transmitting digital modulation signal. These digital modulation signals transmitted and received are converted into PCM signals, and are stored in the RAM 203.

As shown in FIG. 4C, data signals start at a second rising edge of CLK from a rising edge of FSYNC. Eight data signals from DA7 to DA0 of the receiving channel and eight data signals from DB7 to DB0 of the transmitting channel are transferred by time sharing in synchronization with CLK.

In this case, as shown in FIG. 4C, the data signals of the two channels that are encoded by the PCM codec 304 are output as continuous 16-bit data.

For example, the PCM signals transmitted at the transfer rate of 64 kbps and the PCM signals received at the transfer rate of 64 kbps are stored in the RAM 203 in association with time base.

FIG. 4D is a timing chart in a case where SDI is switched to SDO in the PCM interface that enables a bidirectional transfer.

In FIG. 4D, SDO1 and SDO2 represent digital modulation signals transferred by two channels (a transmitting channel and a receiving channel). Thus, when SDI is switched to SDO, SDO1 transmits data signals from DA7 to DA0 and SDO2 transmits data signals from DB7 to DB0 in synchronization with the clock signal CLK.

Next, the T.30 communication procedures in an analog facsimile machine using the PSTN 109 will be described.

Figure 5:
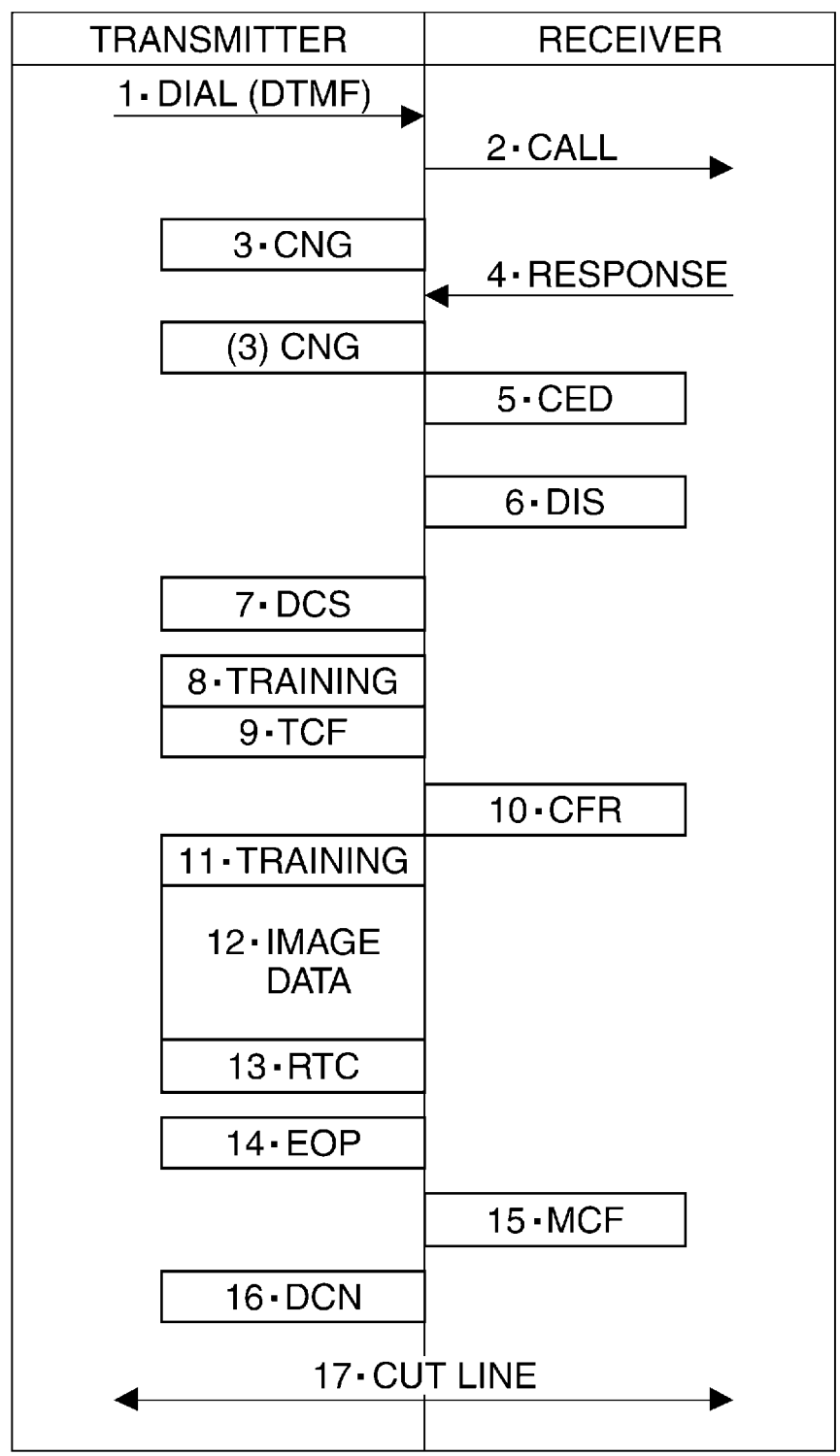
FIG. 5 is a sequential chart in T.30 communication.

FIG. 5 is a sequential chart in the T.30 communication. The communication procedures are as follows.
1. Dial from Transmitter
2. Call from Exchange
3. CNG: Show FAX of Autodial
4. Off-hook by Receiver as Response
5. CED: Show FAX of Automatic Reception
6. DIS: Notify Transmitter of Function of Receiver
7. DCS: Designate Mode and Make Receiver Receive
8. Training: Transmit to Adjust Receiving Condition of Modem of Receiver
9. TCF: Transmit Using Modem Designated by DCS
10. CFR: Notify Transmitter that TCF was Received Normally and Reception Completed
11. Training: Transmit to Adjust Receiving Condition of Modem of Receiver
12. Image Data: Coded Image Signal
13. RTC: Transmit End of One Page of image
14. EOP: Notify Receiver that Transmission was Finished
15. MCF: Notify Transmitter that Image was Received Normally
16. DCN: Instruct Receiver to Cut Line
17. Transmitter and Receiver Cut Line The procedure 12 relevant to the embodiment will be particularly described. Since the above-mentioned sequence is general communication procedures of the T.30 communication, descriptions for the other procedures are omitted.

In the procedure 12 (Image Data: Coded Image Signal), image data (an analog signal) received through the PSTN 109 is converted into a digital signal by the ADC 306 of the SDAA 305, and is output to the modem processing unit 302 as a digital modulation signal.

The output digital modulation signal is demodulated by the DSP processing unit 303 of the modem processing unit 302, and then, is output to the compression processing unit 206 through the interface converting unit 301. The compression processing unit 206 applies a composite process to the demodulated signal.

After a series of the above-mentioned procedures 13 through 17 is completed, the received image data is printed by the printer 213.

Moreover, the transmissions and the receptions of the procedure signals in the procedures 5 through 10 are controlled by the modem processing unit 302 according to the T.30 procedure, for example. Specifically, the received procedure signals are output as digital modulation signals to the modem processing unit 302, and are demodulated. The modem processing unit 302 outputs the transmitting procedure signals as digital modulation signals.

Figure 6:
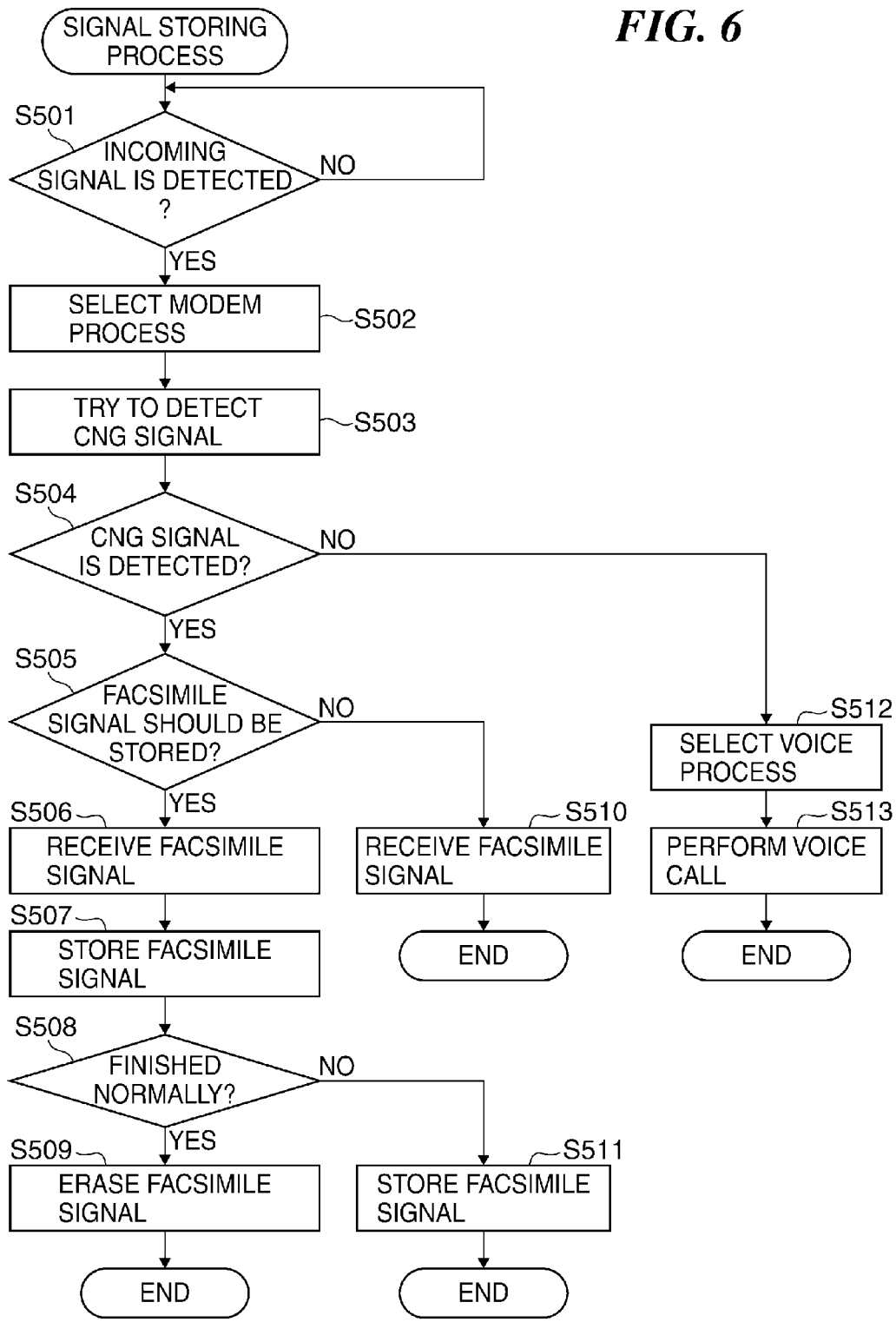
FIG. 6 is a flowchart showing procedures of a signal storing process executed by a CPU shown in FIG. 2.

FIG. 6 is a flowchart showing procedures of a signal storing process executed by the CPU 201 shown in FIG. 2.

The signal storing process in FIG. 6 shows procedures of the process that the first-type image communication apparatus 101 executes. The first-type image communication apparatus 102 serves as a calling side, and the first-type image communication apparatus 101 serves as an incoming side. Moreover, an automatic receiving operation shall be performed in the process. The automatic receiving operation automatically determines whether an incoming signal is a voice signal of a telephone call or a facsimile signal by detecting presence of a CNG (Calling) signal.

As shown in FIG. 6, when an incoming signal is detected (YES in step S501), a call connection request by a calling by the image communication apparatus 102 is transmitted to the image communication apparatus 101. Accordingly, call connection with the image communication apparatus 102 is established and a connecting operation starts under the control of the CPU 201.

Since the automatic receiving operation is performed in the signal storing process in FIG. 6 as mentioned above, the SW unit 310 separates the voice input-output unit 309 from the PSTN 109 under the control of the CPU 201, and the SDAA 305 selects a modem process (step S502) by controlling the capture state with the PSTN 109 to output a communication signal to the modem processing unit 302, in the image communication apparatus 101.

Next, the modem processing unit 302 tries to detect a CNG signal in order to determine whether the received signal is a facsimile signal (step S503).

As a result of the determination in the step S503, when the modem processing unit 302 does not detect a CNG signal (NO in the step S504), the SDAA 305 stops controlling the capture state with the PSTN 109, and connects the voice input-output unit 309 to the PSTN 109 by switching the SW unit 310. Thus, a voice process by the voice input-output unit 309 is selected (step S512), a voice call is performed (step S513), and this process is finished.

On the other hand, as a result of the determination in the step S503, when a CNG signal is detected by the modem processing unit 302 (YES in the step S504), it is determined whether a facsimile signal should be stored (step S505) because the signal is not a voice signal by a telephone call but is a facsimile signal. The setting about whether a facsimile signal should be stored has been defined beforehand, and the setting is stored in the ROM 202 or the HDD 214.

As a result of the determination in the step S505, when a facsimile signal should not be stored (NO in the step S505), a facsimile signal is received according to the T.30 communication procedures shown in FIG. 5 (step S510), and this process is finished.

On the other hand, as a result of the determination in the step S505, when a facsimile signal should be stored (YES in the step S505), a facsimile signal is received according to the T.30 communication procedures shown in FIG. 5 (step S506), and a facsimile signal is stored into the RAM 203 as a PCM signal (step S507) as shown in FIG. 4A through FIG. 4D.

Next, it is determined whether the reception of the facsimile signal has been normally finished (step S508). As a result of the determination in the step S508, when the reception has been normally finished (YES in the step S508), the PCM signals stored in the RAM 203 are erased (step S509), and this process is finished.

On the other hand, as a result of the determination in the step S508, when the reception has not normally finished (NO in the step S508), the PCM signals stored in the RAM 203 are stored into the HDD 214 (step S511), and this process is finished.

The process in the step S511 corresponds to a modulated digital signal storing unit and a demodulated digital signal storing unit. The modulated digital signal storing unit stores a digital signal that is modulated by the modem processing unit 302 for transmitting to an opposite-side apparatus in facsimile communication into the HDD 214 without converting into an analog signal. The demodulated digital signal storing unit stores a digital signal that is obtained by demodulating a signal received from the opposite-side apparatus by the modem processing unit 302 into the HDD 214. Particularly in the step S511, the digital signal that will be D/A-converted and transmitted to the PSTN 109 and the digital signal that is obtained by A/D-converting the analog signal received from the PSTN 109 are stored.

The facsimile signals of the two channels (transmitting channel and receiving channel) should be stored into the HDD 214 in association with time base. The signals of the two channels may be stored into two separate areas or may be stored into one area by interleaving alternately in synchronization with the clock signal CLK.

Moreover, the facsimile signals may be stored into the HDD 214 after converting into voice signals in a standard format that is usable by a PC (Personal Computer) etc.

In the above description, the configuration and the process of the facsimile communication through the PSTN 109 are described. Hereafter, a configuration and a process in facsimile communication through the NGN 110 using the second-type image communication apparatuses 103 and 104 will be described.

The second-type image communication apparatuses 103 and 104 perform facsimile communication by a digital facsimile procedure of the ITU-T recommendation T.38 and T.30 facsimile communication with a VoIP (Voice Over IP) deemed voice by a digital facsimile procedure of the ITU-T recommendation T.30.

Figure 7:
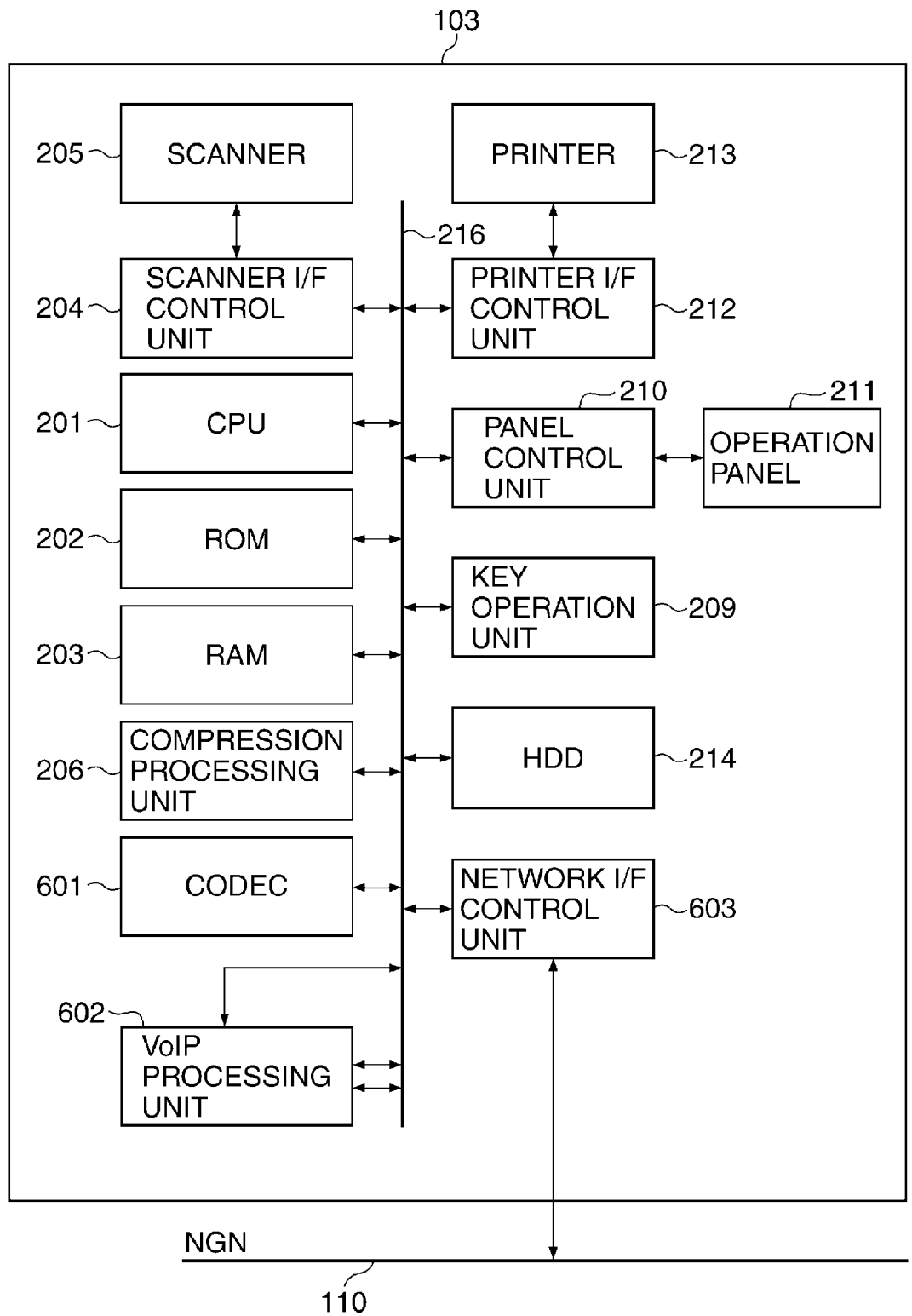
FIG. 7 is a block diagram schematically showing a configuration of a second-type image communication apparatus shown in FIG. 1.

FIG. 7 is a block diagram schematically showing a configuration of the second-type image communication apparatus 103 shown in FIG. 1. The second-type image communication apparatus 104 also has the same configuration as the second-type image communication apparatus 103. Moreover, the descriptions about the elements identical to the elements of the first-type image communication apparatus 101 shown in FIG. 2 are omitted.

The apparatus shown in FIG. 7 is configured by adding a CODEC (Compressor/Decompressor) 601, a VoIP processing unit 602, and a network interface control unit 603 in place of the communication processing unit 208 in FIG. 2. The CODEC 601, the VoIP processing unit 602, and the network interface control unit 603 are connected to the system bus 216.

The CODEC 601 supports an encoding-decoding system that is required to transmit and receive a T.38 digital-facsimile signal.

The VoIP processing unit 602 supports an encoding-decoding system of the VoIP method for a voice signal or a facsimile signal transmitted and received as deemed voice.

The network interface control unit 603 transmits and receives data to and from the HGW 106 through the CSMA/CD interface.

Figure 8:
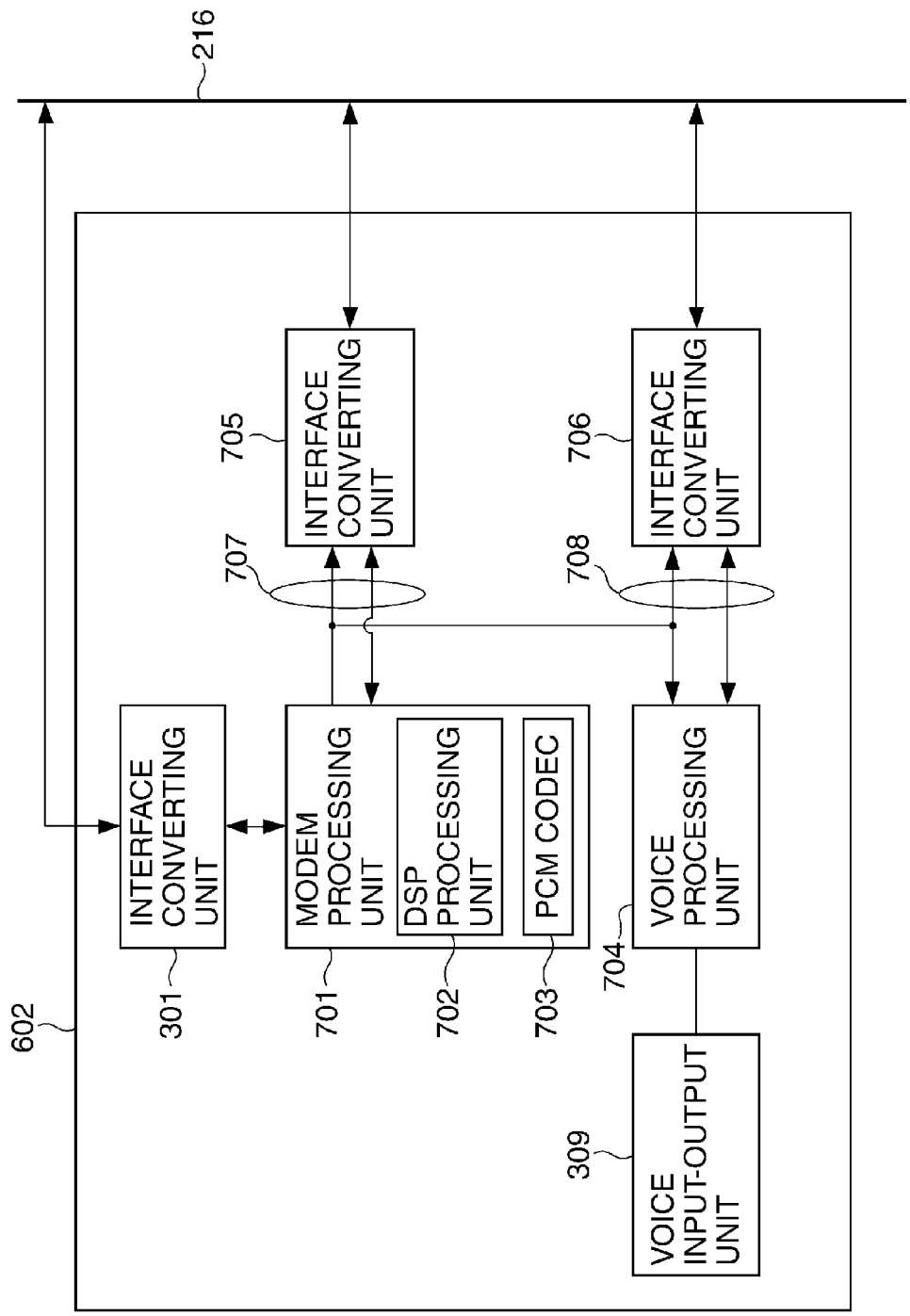
FIG. 8 is a block diagram schematically showing a configuration of a VoIP processing unit shown in FIG. 7.

FIG. 8 is a view schematically showing a configuration of the VoIP processing unit 602 shown in FIG. 7.

As shown in FIG. 8, the VoIP processing unit 602 includes interface converting units 301, 705, and 706, a modem processing unit 701, a voice processing unit 704, and a voice input-output unit 309.

The interface converting unit 301 is connected between the system bus 216 and the modem processing unit 701, and performs conversion for fitting the interface for transmission and reception of data.

Moreover, the interface converting unit 705 is connected between the system bus 216 and the modem processing unit 701, and the interface converting unit 706 is connected between the system bus 216 and the voice processing unit 704. The interface converting units 705 and 706 perform conversion for transmitting and receiving data so as to fit the PCM interfaces 707 and 708, respectively.

The modem processing unit 701 includes a DSP processing unit 702 and a PCM codec 703, and transmits and receives image data to and from the compression processing units 206 through the interface converting unit 301.

At the time of transmission of image data, compressed image data encoded by the compression processing unit 206 is input into the DSP processing unit 702. The DSP processing unit 702 digitally modulates the compressed image data, and outputs it as a digital modulation signal of the voice grade to the PCM codec 703.

The PCM codec 703 encodes the digital modulation signal, and outputs it as a PCM signal to the interface converting unit 705 through the PCM interface 707.

At the time of reception of image data, the PCM codec 703 decodes the PCM signal input through the PCM interface 707 from the interface converting unit 705, and outputs it as a digital modulation signal of the voice grade to the DSP processing unit 702.

The DSP processing unit 702 digitally demodulates the digital modulation signal of the voice grade to obtain compressed image data, and outputs the compressed image data to the compression processing unit 206 through the interface converting unit 301.

The voice input-output unit 309 is connected to the voice processing unit 704, and consists of a telephone or a hand set that inputs and outputs voice.

When transmitting voice, the voice processing unit 704 converts an analog voice signal from the voice input-output unit 309 into a PCM signal that is a digital signal of the voice grade, and outputs the PCM signal to the interface converting unit 706 through the PCM interface 708.

Moreover, when receiving voice, the voice processing unit 704 converts a PCM signal that is a digital signal of the voice grade and is input from the interface converting unit 706 through the PCM interface 708 into an analog voice, and outputs the analog voice to the voice input-output unit 309.

The digital signal of the voice grade processed by the voice processing units 704 or the modem processing unit 701 is a PCM signal of a voice signal or "a facsimile signal transmitted and received as deemed voice".

It should be noted that one of the PCM interfaces serves as a master and the other serves as a slave in general as mentioned above. However, there is no need to be limited to this.

Moreover, the PCM interface 708 can supply CLK and FSYNC used by the PCM interface 707 to both the PCM interfaces, and can transfer a data signal by making both of parts into slaves.

In this case, since the PCM interfaces 707 and 708 operate with the same timing signal, the same data signal can be transferred without considering timing because they are synchronized.

It should be noted that the PCM interfaces 312, 707, and 708 may be general synchronization serial interfaces. For example, an interface may support synchronous serial transfer that employs chip select (CS) in place of FSYNC, or may support synchronous serial transfer of TDM (Time Division Multiplexing) that transfers a plurality of data signals by time sharing.

Moreover, the interface converting units 311, 705, and 706 may convert an interface other than the system bus 216. For example, the interface converting units may convert asynchronous serial interface, such as UART (Universal Asynchronous Receiver Transmitter) that is a general interface of the CPU 201 and performs asynchronous serial transfer.

Next, communication procedures at the time of establishing an SIP session will be described.

Figure 9A:
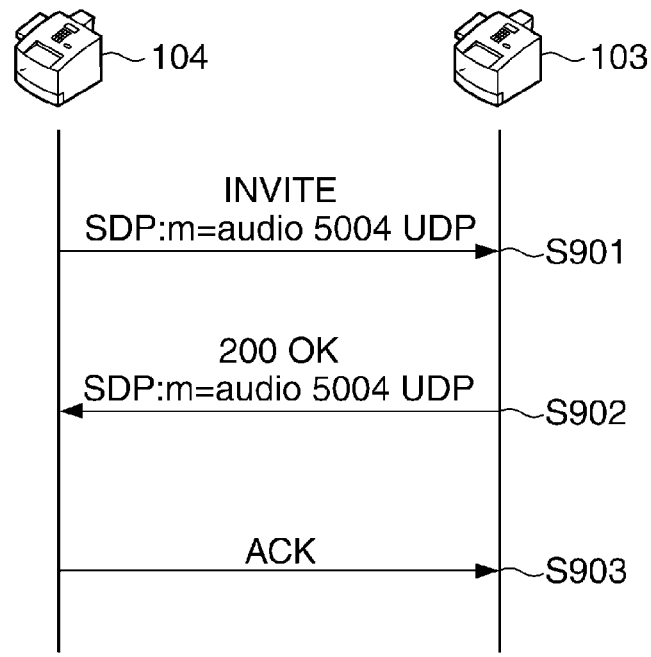
FIG. 9A and FIG. 9B are sequential charts showing communication procedures at the time of establishing an SIP session.
Figure 9B:
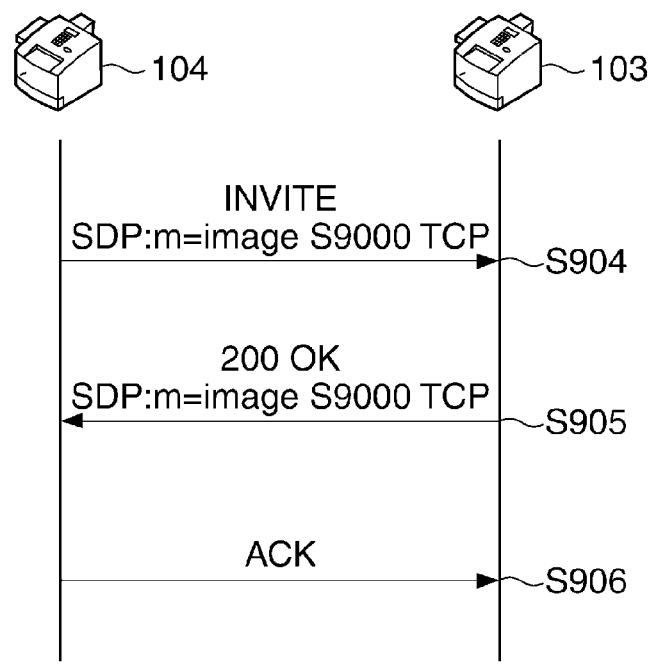

FIG. 9A and FIG. 9B are sequential charts showing communication procedures at the time of establishing an SIP session.

FIG. 9A and FIG. 9B show examples where the second-type image communication apparatus 104 transmits an SIP connection request message (INVITE) to the second-type image communication apparatus 103 first.

FIG. 9A is a sequential chart showing communication procedures at the time of establishing an SIP session that are executed for a purpose of a telephone call.

As shown in FIG. 9A, the second-type image communication apparatus 104 transmits an INVITE message to the second-type image communication apparatus 103 (step S901). The INVITE message includes an SDP (Session Description Protocol) in which media information that would like to be used in an SIP session and a receiving port number are described.

In this case, the SDP describes "m=audio 5004 UDP" for the purpose of the telephone call. This suggests establishing an SIP session that performs data communication of which the media classification is audio using the port number 5004 of a UDP.

When the second-type image communication apparatus 103 receives the INVITE message to itself, the apparatus 103 examines an offer SDP included in the INVITE message, and transmits a "200 OK" message when responsible media information is described (step S902).

The "200 OK" message includes an SDP in which the media information that is acceptable by the second-type image communication apparatus 103 and the receiving port number are described.

In this case, since the SDP describes "m=audio 5004 UDP", the second-type image communication apparatus 103 agrees to establish the SIP session that performs data communication of which the media classification is audio using the port number 5004 of the UDP.

When receiving the "200 OK" message, the second-type image communication apparatus 104 transmits an ACK message showing that the "200 OK" message has been received (step S903).

FIG. 9B is a sequential chart showing communication procedures at the time of establishing an SIP session that are executed for a purpose of image data communication.

As shown in FIG. 9B, the second-type image communication apparatus 104 transmits an INVITE message to the second-type image communication apparatus 103 (step S904). In this case, the SDP describes "m=audio 9000 TCP" for the purpose of the image communication. This suggests establishing an SIP session that performs data communication of which the media classification is an image using the port number 9000 of a TCP.

When the second-type image communication apparatus 103 receives the INVITE message to itself, the apparatus 103 examines an offer SDP included in the INVITE message, and transmits a "200 OK" message when responsible media information is described (step S905).

The "200 OK" message includes an SDP in which the media information that is acceptable by the second-type image communication apparatus 103 and the receiving port number are described.

In this case, since the SDP describes "m=audio 9000 TCP", the second-type image communication apparatus 103 agrees to establish an SIP session that performs data communication of which the media classification is the image using the port number 9000 of the TCP as a receiving port.

When receiving the "200 OK" message, the second-type image communication apparatus 104 transmits an ACK message showing that the "200 OK" message has been received (step S906).

Next, T.30 digital facsimile communication will be described. The T.30 digital facsimile communication is facsimile communication using VoIP deemed voice according to the T.30 facsimile procedure. In the T.30 digital facsimile communication, a procedure signal is transmitted and received, and an image signal is received.

The digital facsimile communication procedures are similar to the analog facsimile communication procedures shown in FIG. 5.

Specifically, in the procedure 12 (Image Data: Coded Image Signal), image data of the VoIP signal is taken out through the network interface control unit 603. The image data is stored into the RAM 203 and is output to the VoIP processing unit 602.

The VoIP processing unit 602 converts the received image data into a PCM signal by the interface converting unit 705, and outputs it to the modem processing unit 701 through the PCM interface 707. The modem processing unit 701 decodes the PCM signal by the PCM codec 703, and outputs it as a digital modulation signal of the voice grade to the DSP processing unit 702.

The DSP processing unit 702 digitally demodulates the digital modulation signal and outputs it as the compressed image data to the compression processing unit 206 through the interface converting unit 301.

After a series of the above-mentioned procedures 13 through 17 is completed, the received image data is printed by the printer 213.

Moreover, the transmissions and the receptions of the procedure signals in the procedures 5 through 10 are controlled by the modem processing unit 701 according to the T.30 procedure, for example. Specifically, the received procedure signal is output as a digital modulation signal to the modem processing unit 701 and is demodulated. The modem processing unit 701 outputs the transmitting procedure signal as a digital modulation signal.

Figure 10:
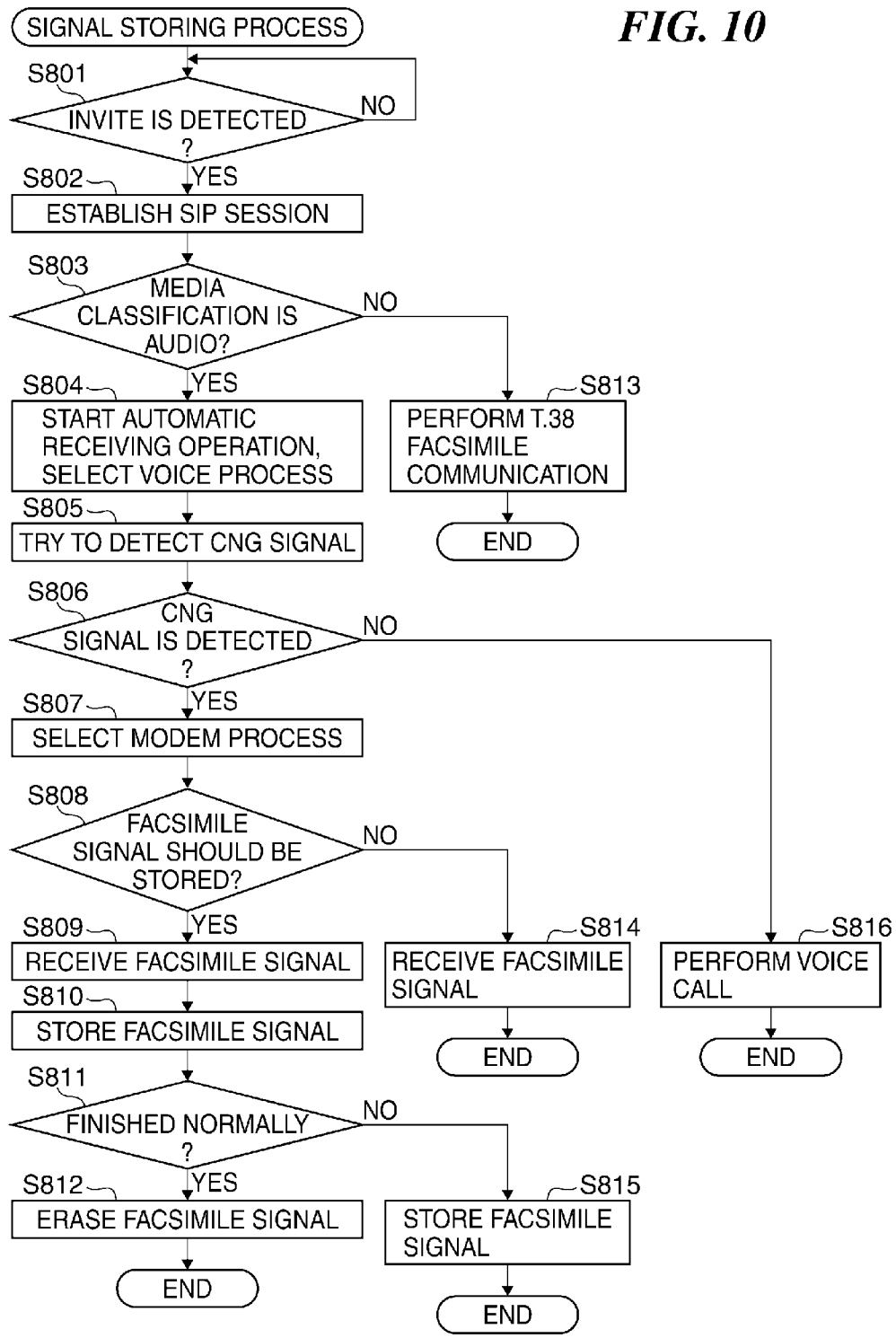
FIG. 10 is a flowchart showing procedures of a signal storing process executed by a CPU shown in FIG. 7.

FIG. 10 is a flowchart showing procedures of a signal storing process executed by the CPU 201 shown in FIG. 7.

The signal storing process in FIG. 10 shows procedures of the process that the second-type image communication apparatus 103 executes. The second-type image communication apparatus 104 serves as a calling side, and the second-type image communication apparatus 103 serves as an incoming side. Moreover, the above-mentioned automatic receiving operation shall be performed in the process.

As shown in FIG. 10, when the INVITE message is detected (YES in step S801), the SIP session is established by executing the SIP session establishment procedures shown in FIG. 9A or FIG. 9B (step S802).

Next, it is determined whether the media classification of the established SIP session is audio (step S803).

As a result of the determination in the step S802, when the media classification is not audio but image (NO in the step S803), facsimile communication by the T.38 digital facsimile procedure is performed (step S813), and this process is finished. The T.38 facsimile communication in the step S813 is specifically described. A T.38 facsimile signal is stored into the RAM 203 through the network interface control unit 603 under the control of the CPU 201, and is decoded by the CODEC 601.

Then the decoded signal is stored as compressed image data into the HDD 214. The compressed image data read from the HDD 214 is decompressed by the compression processing unit 206. The decompressed image data is output to the printer 213 through the printer interface control unit 212, and the T.38 facsimile communication finishes.

On the other hand, as a result of the determination in the step S803, when the media classification is audio (YES in the step S803), a voice call or facsimile communication of the VoIP method by which a facsimile signal is transmitted and received as deemed voice according to the T.30 facsimile procedure becomes possible.

As mentioned above, since the automatic receiving operation is performed in the signal storing process in FIG. 10, the second-type image communication apparatus 103 starts the automatic receiving operation, and selects the voice process by connecting a call while recognizing a reception signal as voice (step S804).

Accordingly, the reception signal is stored into the RAM 203 through the network interface control unit 603 under the control of the CPU 201, and is output to the voice processing unit 704 through the interface converting unit 706 of the VoIP processing unit 602.

At the same time, the reception signal is output to the modem processing unit 701 through the interface converting unit 705 of the VoIP processing unit 602, and the modem processing unit 701 tries to detect a CNG signal (step S805).

In this way, the reception signal is output to both the voice processing unit 704 and the modem processing unit 701 in order to detect a CNG signal. Since the PCM interfaces 707 and 708 operate synchronously with the same timing signal, as mentioned above, they are able to transfer the reception signal to the modem processing unit 701 and the voice processing unit 704 without considering timing when the same reception signal is transferred. It should be noted that the VoIP processing unit 602 may output the reception signal only to the modem processing unit 701 without outputting to the voice processing unit 704.

As a result of the determination in the step S805, when the modem processing unit 701 does not detect a CNG signal (NO in the step S805), the voice processing unit 704 continues the voice process and the voice input-output unit 309 performs a voice call (step S816), and this process is finished.

On the other hand, as a result of the determination in the step S805, when the modem processing unit 302 detects a CNG signal (YES in the step S805), the modem process by the modem processing unit 701 is selected (step S807) because the facsimile signal is transmitted and received as the deemed voice.

Next, it is determined whether a facsimile signal should be stored (step S808). The setting about whether a facsimile signal should be stored has been defined beforehand, and the setting is stored in the ROM 202 or the HDD 214.

As a result of the determination in the step S808, when a facsimile signal should not be stored (NO in the step S808), a digital facsimile signal is received according to the T.30 communication procedure (step S814), and this process is finished.

On the other hand, as a result of the determination in the step S808, when a facsimile signal should be stored (YES in the step S808), a digital facsimile signal is received according to the T.30 communication procedure (step S809), and a facsimile signal is stored into the RAM 203 (step S810).

Next, it is determined whether the reception of the facsimile signal has been normally finished (step S811). As a result of the determination in the step S811, when the reception has been normally finished (YES in the step S811), the PCM signals stored in the RAM 203 are erased (step S812), and this process is finished.

On the other hand, as a result of the determination in the step S811, when the reception has not normally finished (NO in the step S811), the PCM signals stored in the RAM 203 are stored into the HDD 214 (step S815), and this process is finished.

The process in the step S815 corresponds to the modulated digital signal storing unit and the demodulated digital signal storing unit. The modulated digital signal storing unit stores a digital signal that is modulated by the modem processing unit 302 for transmitting to an opposite-side apparatus in facsimile communication into the HDD 214 without converting into an analog signal. The demodulated digital signal storing unit stores a digital signal that is obtained by demodulating a signal received from the opposite-side apparatus by the modem processing unit 302 into the HDD 214. Particularly in the step S815, the digital signal transmitted as the VoIP deemed voice signal to the NGN 110 and the VoIP voice signal received from the NGN 110 are stored.

The storing method in the step S810 mentioned above was described with reference to FIG. 4A through FIG. 4D. Moreover, the received digital modulation signal stored into the RAM 203 at the time of receiving is again stored into the RAM 203 in association with time base together with the transmitting digital modulation signal in the signal storing process in FIG. 10. However, since the received digital modulation signal has been stored from the first, only the transmitting digital modulation signal may be stored into the RAM 203 in association with time base.

The facsimile signals of the two channels (transmitting channel and receiving channel) should be stored into the HDD 214 in association with time base as with the signal storing process in FIG. 6. The signals of the two channels may be stored into two separate areas or may be stored into one area by interleaving alternately in synchronization with the clock signal CLK.

Moreover, the facsimile signals may be stored into the HDD 214 after converting into voice signals in a standard format that is usable by a PC etc. as well as the signal storing process in FIG. 6.

Moreover, in the signal storing process in FIG. 10, although the PCM signal of the voice call transmitted and received in the step S816 is not stored into the HDD 214. This is because a cause of an obstacle cannot be specified even if the stored voice call is used, and a problem of security may occur.

The PCM interface 312 for the modem processing unit 302 shown in FIG. 3 used in the analog facsimile communication is different from the PCM interfaces 707 and 708 for the modem processing unit 701 shown in FIG. 7 used in the facsimile communication with VoIP deemed voice. On the other hand, the DSP processing units 303 and 702, and the PCM codecs 304 and 703 are equivalent.

Specifically, the modem processing unit 302 outputs the PCM signals of two channels (transmitting channel and receiving channel) in the analog facsimile communication.

On the other hand, the modem processing unit 701 outputs the transmitting PCM signal through one channel, and the received PCM signal is inputted through one channel in the digital facsimile communication.

Accordingly, the modem processing unit 302 and the modem processing unit 701 can be commonly used by switching one channel used for receiving in response to whether the current communication is the analog facsimile communication or the digital facsimile communication.

As mentioned above, a facsimile signal may be stored into the HDD 214 after converting into voice signals in a standard format that is usable by a PC etc. Hereafter, a WAV format that is one of the standard voice formats will be described. The WAV format is a format of a standard voice file (WAVE file) of the WINDOWS (registered trademark).

FIG. 11A, FIG. 11B, and FIG. 11C are views for describing the WAV format that is the standard voice format.

FIG. 11A is a view showing a data structure of the WAV format, FIG. 11B is a view showing a configuration of a data field 1009 in FIG. 11A, and FIG. 11C is a view showing format IDs and corresponding formats.

As shown in FIG. 11C, the WAV format supports compression methods, such as a PCM (no compression) method, an A-Law method, a μ-Law method, and an ADPCM method, for example.

Moreover, as shown in FIG. 11A, a WAVE file is handled by Resource Interchange File Format (RIFF), and data is handled by a block called a chunk in this file format, as shown in FIG. 11A.

A RIFF chunk 1001 in FIG. 11A is described first.

In an ID field 1002, an identifier "RIFF" that represents being a RIFF chunk is designated by ASCII characters. The size of this field is 4 bytes.

In a size field 1003, a field size of a RIFF chunk data field 1004 is designated in bytes. It should be noted that a value converted into a hexadecimal number is designated on the file. The size of this field is 4 bytes.

Data of the RIFF chunk is written in the RIFF chunk data field 1004. In the WAVE file for digital audio data of the PCM, a form type 1005, two fmt chunks 1006, and a data chunk 1010 are designated in the RIFF chunk data field 1004. The size of this field is designated in the size field 1003.

ASCII characters "WAVE" that represent being a WAVE file are designated in the form type 1005. The size of this field is 4 bytes.

Next, the fmt chunk 1006 will be described.

In an ID field 1007, an identifier "fmt" that represents being a fmt chunk is designated by ASCII characters (fourth character is a space).

In a size field 1008, a field size of a fmt chunk data field is designated in bytes. It should be noted that a value converted into a hexadecimal number is designated on the file.

As shown in FIG. 11B, a data field 1009 includes a format ID 1101, a channel number 1102, a sampling frequency 1103, an average data-transfer rate 1104, a block size 1105, a number of bits per sample 1106, a header extension size 1107, and a header extension section 1108.

In the format ID 1101 in FIG. 11B, one of the format IDs shown in FIG. 11C is designated corresponding to the format of the WAVE data recorded in the data chunk. The size of this field is 2 bytes.

In the channel number 1102, the channel number of the WAVE data recorded in the data chunk is designated. In the channel number 1102, "1" is designated in a case of monaural recording, and "2" is designated in a case of stereo recording. The size of this field is 2 bytes.

In the sampling frequency 1103, the sampling frequency of the WAVE data recorded in the data chunk is designated. The size of this field is 4 bytes.

In the average data-transfer rate 1104, a value that is obtained by converting the following value ADTS into a hexadecimal number is designated when the WAVE file is subjected to PCM digital audio. The size of this field is 4 bytes.

$$ADTS = SF \cdot CN \cdot BPS/8$$

Where SF denotes a sampling frequency [Hz], CN denotes the channel number, and BPS denotes the number of bits per sample.

In the block size 1105, block alignment of the WAVE data recorded in the data chunk is designated. Reproducing software processes the data of the integral multiple of the designated block size at once. The block alignment BA is calculated by the following formula. The size of this field is 2 bytes.

$$BA = CN \cdot BPS/8$$

In the number of bits per sample 1106, a value that is obtained by converting the sampling bit number of the WAVE data recorded in the data chunk into a hexadecimal number is designated. The size of this field is 2 bytes.

In the header extension size 1107, the size of the header extension section is designated in bytes if needed. The size of this field is 2 bytes.

The header extension section 1108 contains data of a header extension section. The size of this field is designated in the header extension size 1107 in bytes.

Next, the data chunk 1010 will be described.

In an ID field 1011, an identifier "data" that represents being a data chunk is designated by ASCII characters. The size of this field is 4 bytes.

In a size field 1012, a size of a data field in the data chunk is designated in bytes. It should be noted that a value converted into a hexadecimal number is designated on the file. The size of this field is 4 bytes.

WAVE data is recorded in a data field 1013. The size of this field is designated in the size field 1012.

Moreover, a relation among the channel number 1102, the number of bits per sample 1106, and a format of data in the data chunk 1009 of the fmt chunk is as follows.

In a case where the channel number is "1" and the number of bits per sample is "8", the data format is defined so that data signals encoded by 8 bits are written in order.

In a case where the channel number is "2" and the number of bits per sample is "8", the data format is defined so that data signals encoded by 8 bits are written in order from a left channel to a right channel. The data of the beginning of the data field is certainly a left channel.

In a case where the channel number is "1" and the number of bits per sample is "16", the data format is defined so that data signals encoded by 16 bits are written in order from lower 8 bits (lower byte) to upper 8 bits (upper byte) in little-endian.

Thus, a facsimile signal is converted into a voice signal in the standard format that is usable by a PC etc., and the voice signal is stored. It should be noted that facsimile signals that are communication signals supplied to a receiver from a transmitter and communication signals supplied to the transmitter from the receiver may be stored as monaural PCM signals (data of one channel). Moreover, communication signals supplied to the receiver from the transmitter and communication signals supplied to the transmitter from the receiver may be stored as stereo PCM signals (data of two channels).

Furthermore, although the storing of facsimile communication in the automatic receiving operation is described in the embodiment, facsimile communication in an receiving operation other than the automatic receiving operation and a transmitting operation of a facsimile image can be also stored as PCM signals.

Moreover, the facsimile signals stored as the PCM signals in association with time base are used so that communication procedures and image signals are analyzed at the time of an obstacle like a communication error to specify a cause of the obstacle in the embodiment, for example.

Accordingly, the timing to start storing a facsimile signal and the timing to finish storing in the sequence of the T.30 communication in FIG. 5 are arbitrarily defined. For example, only the minimum section required to specify a cause of an obstacle may be stored in the sequence after CNG. When storing only the specific section, the necessary capacity of the nonvolatile memory of the HDD 214 is reduced.

Moreover, although the facsimile signals are stored as PCM signals in association with time base in the embodiment, image information transmitted and received as facsimile signals may be stored in association with them.

It should be noted that the image information means compressed image data that is compressed by the compression processing unit 206 at the time of transmission, and means compressed image data obtained by demodulating received digital modulation signals by the DSP processing units 303 and 702 including the image data received to the middle at the time of reception.

According to the embodiment, a communication signal in facsimile communication is stored as a digital voice signal with high quality in facsimile communication through the public network or facsimile communication with VoIP deemed voice through a network.

Since the signal is stored in the general standard format, the digital voice signal is easily used by an apparatus other than the facsimile machine.

According to the embodiment mentioned above, the digital signal that the modem processing unit modulates for transmitting to the opposite-side apparatus in the facsimile communication is stored into the storage unit without converting into an analog signal. The digital signal that is obtained by demodulating a signal received from the opposite-side apparatus in the facsimile communication by the modem processing unit is stored into the storage unit (the steps S511 and S815). Accordingly, the facsimile signal is stored with high quality.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-068642, filed Mar. 28, 2014, which is hereby incorporated by reference herein in its entirety.

What is claimed is:

1. A communication apparatus comprising:
    a modem processing unit configured to perform facsimile communication;
    a modulated digital signal storing unit configured to store into a storage unit a first pulse code modulated (PCM) digital signal that is modulated by said modem processing unit, for transmission to an opposite-side apparatus in the facsimile communication without converting the first PCM digital signal to a first analog signal;
    a network interface control unit configured to transmit the stored first PCM digital signal to the opposite-side apparatus without converting the first PCM digital signal to the first analog signal; and
    a demodulated digital signal storing unit configured to store into the storage unit a second digital signal that is obtained by demodulating a received second PCM digital signal received from the opposite-side apparatus in the facsimile communication by said modem processing unit,
    wherein the second PCM digital signal is received from the opposite-side apparatus without conversion from a second analog signal.

2. The communication apparatus according to claim 1, wherein the facsimile communication is performed through a PSTN,
    wherein the first PCM digital signal stored by said modulated digital signal storing unit is a signal that is D/A-converted and is transmitted to the PSTN, and
    wherein the second digital signal stored by said demodulated digital signal storing unit is obtained by A/D-converting the received signal,
    wherein the received signal is the second analog signal received from the PSTN.

3. The communication apparatus according to claim 1, wherein the facsimile communication with VoIP deemed voice is performed through a network, wherein the first PCM digital signal stored by said modulated digital signal storing unit is a VoIP deemed voice signal that is transmitted to the network, and wherein the second digital signal stored by said demodulated digital signal storing unit is a VoIP deemed voice signal received from the network.

4. The communication apparatus according to claim 1, wherein a format of the first PCM digital signal stored by said modulated digital signal storing unit and the second digital signal stored by said demodulated digital signal storing unit is one of linear PCM, G.711 A-Law, and G.711 µ-Law.

5. A control method for a communication apparatus having a modem processing unit that performs facsimile communication, the control method comprising:

a modulated digital signal storing step of storing into a storage unit a first pulse code modulated (PCM) digital signal that is modulated by said modem processing unit, for transmission to an opposite-side apparatus in the facsimile communication without converting the first PCM digital signal to a first analog signal;

a network interface control step of transmitting the stored first PCM digital signal to the opposite-side apparatus without converting the first PCM digital signal to the first analog signal; and a demodulated digital signal storing step of storing into the storage unit a digital signal that is obtained by demodulating a received second PCM digital signal received from the opposite-side apparatus in the facsimile communication by the modem processing unit, wherein the second PCM digital signal is received from the opposite-side apparatus without conversion from a second analog signal.

6. A non-transitory computer-readable storage medium storing a control program causing a computer to execute a control method for a communication apparatus having a modem processing unit that performs facsimile communication, the control method comprising:

a modulated digital signal storing step of storing into a storage unit a first pulse code modulated (PCM) digital signal that is modulated by said modem processing unit, for transmission to an opposite-side apparatus in the facsimile communication without converting the first PCM digital signal to a first analog signal;

a network interface control step of transmitting the stored first PCM digital signal to the opposite-side apparatus without converting the first PCM digital signal to the first analog signal; and a demodulated digital signal storing step of storing into the storage unit a digital signal that is obtained by demodulating a received second PCM digital signal received from the opposite-side apparatus in the facsimile communication by the modem processing unit, wherein the second PCM digital signal is received from the opposite-side apparatus without conversion from a second analog signal.

* * * * *